May 16, 1950 R. P. JACOBSEN 2,507,977
CAR CRIB

Filed Jan. 9, 1950 2 Sheets-Sheet 1

INVENTOR.
R. P. JACOBSEN
BY
*A. Yates Dowell*
ATTORNEY

May 16, 1950  R. P. JACOBSEN  2,507,977
CAR CRIB
Filed Jan. 9, 1950  2 Sheets-Sheet 2
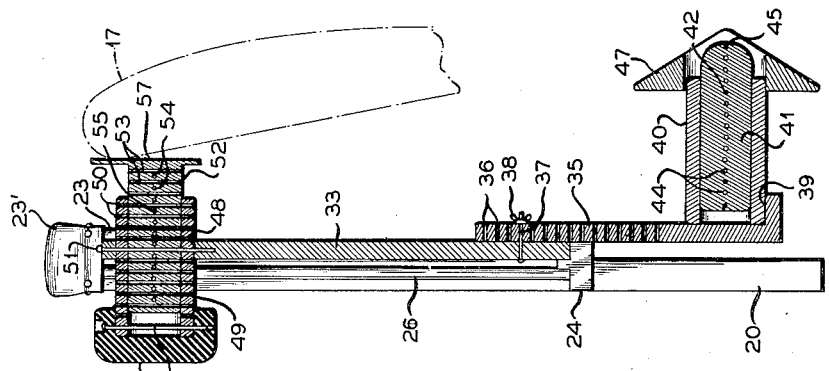
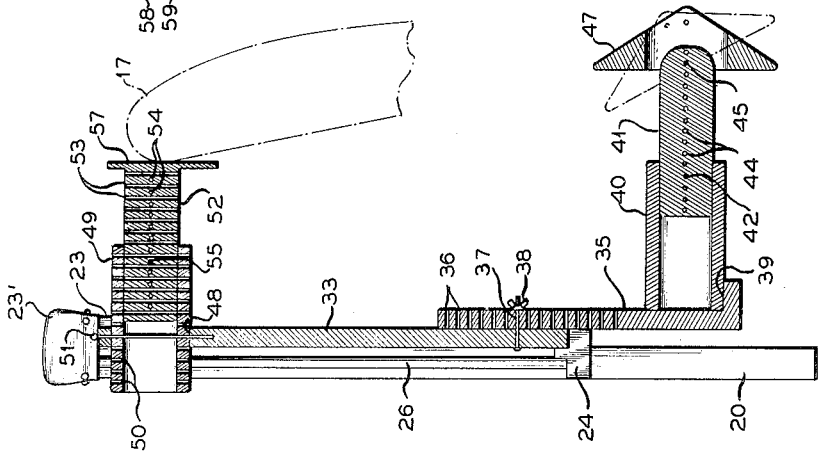
INVENTOR.
R. P. JACOBSEN
BY
*A. Yates Dowell*
ATTORNEY Patented May 16, 1950

2,507,977

UNITED STATES PATENT OFFICE 2,507,977

CAR CRIB

Robert P. Jacobsen, Elizabethtown, Pa.

Application January 9, 1950, Serial No. 137,569

6 Claims. (Cl. 5—94)

This invention relates to the care, protection and transportation of human beings of tender years or prior to the age of accountability, and more particularly to attachments or accessories applicable to land, air or sea vehicles for providing an enclosure for a portion of a vehicle to confine a small child therein during waking or sleeping moments with maximum security and safety and without the attention of adults.

The transportation of small children has always been a problem to which much time and thought has been given in an effort to provide a satisfactory solution of the same. In automobiles and other two-seated vehicles mechanism of various kinds have been utilized in an attempt to provide a safe secure place for the child. However, such devices have not been entirely satisfactory for various reasons including variations in styles and dimensions, particularly the width of the vehicle as well as the distance or space between the front and rear seats.

An object of the invention is to provide a simple, inexpensive fence or partition which can be easily installed and adjusted to the proper position or easily removed and stored and which will, when in position, transform the back seat of an automobile or other vehicle into a combination child's crib and play pen.

A further object of the invention is to provide a device of the above character which may be held in position by adjustable sliding brackets engaging the back of the front seat in spaced positions as well as the floor for maintaining the partition securely in place.

Another object of the invention is to provide a structure of the character described which can be easily dismantled and compactly stored in a small space in a minimum of time.

Further objects and advantages of the invention will become apparent from the following description taken in conjunction with the accompanying drawings, wherein:

Fig. 3 is a section on the line 3—3 of Fig. 2;

Fig. 4 is a section on the line 4—4 of Fig. 2 and

Fig. 5 is a section similar to that of Fig. 4 with parts in different positions.

Figure 1:
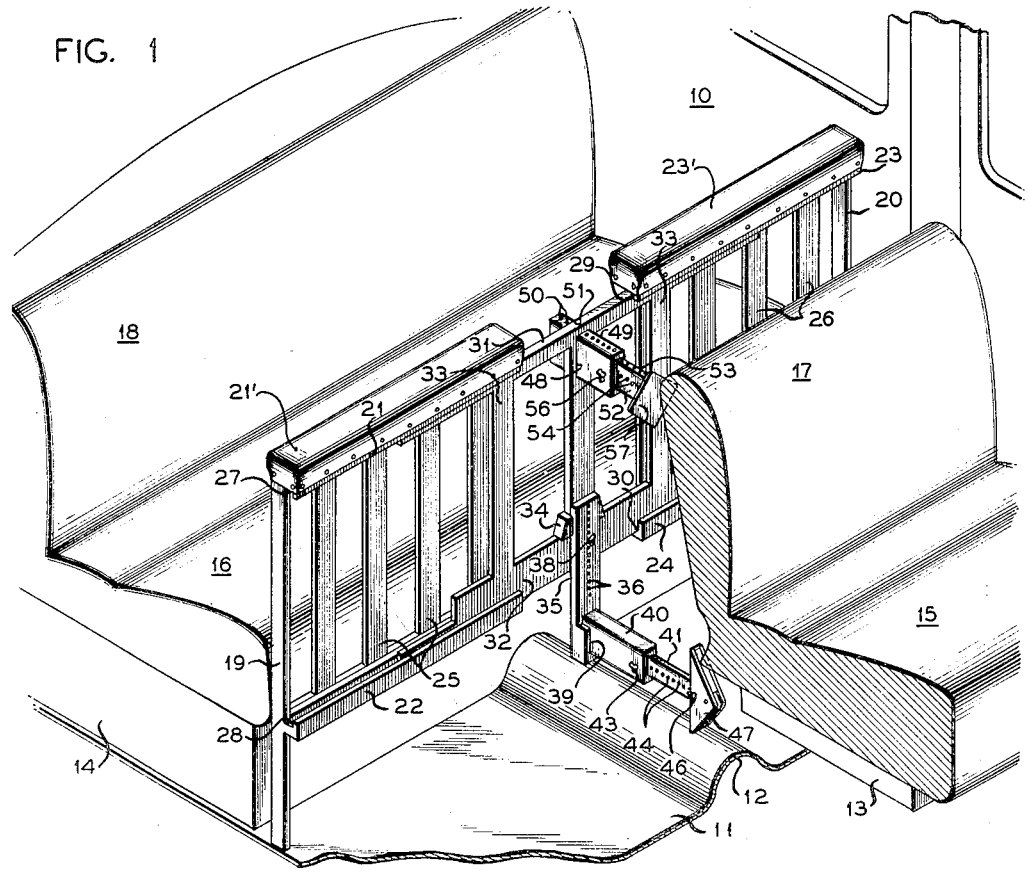
Fig. 1 is a perspective illustrating one application of the invention with parts in section.
Figure 2:
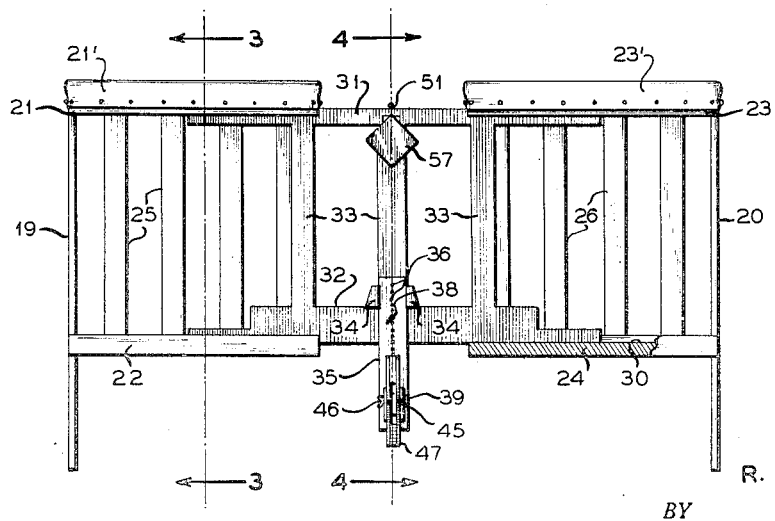
Fig. 2 is a front elevation.

Briefly stated the fence or partition of the present invention comprises a central and two end fence sections formed of top and bottom rails and upright connecting bars with the end sections provided with opposed channels slidably receiving the intermediate section. Also, the top of the end portions are preferably padded to prevent injury to the child and adjustable brackets are provided for supporting the device.

With continued reference to the drawings, a vehicle which may be aircraft, boat or automobile, may have a body 10, a floor 11 with a ridge 12 forming a transmission channel or tunnel. Front and rear seat supports 13 and 14 support front and rear seats 15 and 16 with appropriate back rests 17 and 18, all of which previously described parts are of conventional construction. Products of different manufacturers vary in form and dimensions and consequently the interior widths of the vehicles vary as well as the distance and height of the seats above the floor and the presence or absence of the ridges 12 and distance from the top of the same to the seat and in the provision of a retaining panel partition or fence, such must be taken into consideration.

The structure of the present invention comprises a pair of fence sections or end members comprising end posts 19 and 20, the end post 19 being attached to top and bottom rails 21 and 22 and the post 20 being attached to top and bottom rails 23 and 24. Bars 25 join the top and bottom rails 21 and 22 and bars 26 join the top and bottom rails 23 and 24. Top and bottom rails 21 and 22 are provided with upper and lower grooves or trackways 27 and 28 and the upper and lower rails 23 and 24 are provided with corresponding grooves or trackways 29 and 30. The upper rails 21 and 23 are preferably provided with padding indicated at 21' and 23', respectively, to prevent injury to a child falling and coming in contact therewith.

The end sections are of a total length almost equal to the width of the interior of the automobile or other vehicle in which the device is to be applied. However, in order to permit such end sections to be moved apart slightly to accommodate automobiles of slightly greater width they are independently formed and connected by an intermediate member consisting of top and bottom rails 31 and 32 slidably received in the trackways 27—29 and 28—30, such upper and lower rails 31 and 32 being connected by upright bars or slats 33.

On opposite sides of one of such bars are opposed guide projections 34 between which a supporting foot or bracket 35 is adapted to be adjustably positioned for engaging the ridge 12 in the floor of the car. The foot or bracket 35 is provided with longitudinal openings 36 for reception of a stud or bolt 37 on which is mounted a wing nut 38 and by means of which the foot or bracket 35 may be firmly secured to the intermediate section of the device.

The bracket 25 is provided with a socket 39 in which is adapted to be disposed a sleeve 40 telescopically receiving an extensible adjustable arm 41 held therein by means of a bolt 42 and a wing nut 43. The arm 41 is likewise provided with longitudinally disposed perforations 44 for the reception of a fastening bolt and wing nut for holding the arm in its properly adjusted position in the sleeve 40 while through one of such openings at the outer end of the arm may be disposed another bolt 45 and wing nut 46 assembly for holding a leg or support in the form of a presser foot 47. The presser foot engages the rear portion of the seat 15 and the ridge 12 of the floor. Thus, differences in height of the device are accommodated by the bracket 35 and the difference in distance between the front and rear seats by the sleeve arm and foot assemblies 40, 41 and 47.

In order to brace the device centrally of its upper portion an intermediate bar 33 is provided with a slot 48 for receiving the rectangular sleeve 49 having perforations 50 for receiving a pin 51 permitting relative longitudinal adjustment of the sleeve 49 in slot 48. Within the sleeve 49 is mounted an arm 52 provided with correspondingly spaced perforations 53 by means of which the sleeve can also be held in its longitudinally adjusted position by means of the pin 51 or if desired additional perforations 54 may be provided through which a bolt 55 may be disposed held by a wing nut 56. On the outer end of the arm 52 may be disposed a suitable enlargement or head 57 for engaging the upper rear portion of the back rest 17 of the vehicle. The head 57 is eccentrically mounted, so that by reversal of the arm 52 differences in vertical position of such head may be obtained.

If desired, the inner extremity of the sleeve 49 may be provided with a resilient protective guard 58, as indicated in Fig. 5 of the drawings, manufactured from sponge rubber or other suitable material. The guard 58 may be maintained in position by a pin 59, similar to the pin 51, and receivable within a pair of aligned perforations 50.

The construction and arrangement of the adjustable parts just described accommodate for any desirable difference in the height and the front seat forwardly of the vehicle.

It will readily be understood that by the provisions of the three part retaining fence or partition an enclosure in the back seat of an automobile or other vehicle may be simply and easily provided without danger of the child being injured by coming in contact with the same, due to sudden starting or stopping of the vehicle or for other reasons that such devices may be easily installed or removed and packed compactly for shipment or storage without alteration or modification of the vehicle.

It will be obvious to those skilled in the art that various changes may be made in the invention without departing from the spirit and scope thereof and, therefore, the invention is not limited by that which is shown in the drawings and described in the specification, but only as indicated in the appended claims.

What is claimed is:

1. A device for application along the front of the rear seat of an automobile for transforming such seat into a combination child's crib and play pen, comprising a pair of spaced fence sections for disposition in upright substantially end-to-end relation, an intermediate connecting fence section of less length, each of said fence sections having top and bottom rails and spaced connecting bars between the same, padding applied to the top rails of said pair of fence sections, said fence sections having longitudinally disposed interfitting relatively slidable portions and depending supporting legs, one of such legs being disposed substantially centrally of the intermediate section and said other of such legs being disposed one adjacent the remote end of each of the other two sections respectively, means adjustably mounting the leg of the intermediate section, spaced laterally disposed extensible arm means carried by said intermediate section for engagement with the back of an adjacent seat for maintaining said device in fixed location, and abutment means for location on the ends of said arms disposable in different positions for varying the engagement of said arms with the seat.

2. A device for application along the front of the rear seat of an automobile for transforming such seat into a combination child's crib and play pen, comprising a pair of spaced fence sections for disposition in upright substantially end-to-end relation, an intermediate connecting fence section of less length, each of said fence sections having top and bottom rails and spaced connecting bars between the same, padding applied to the top rails of said pair of fence sections, said fence sections having longitudinally disposed interfitting relatively slidable portions and depending supporting legs, one of such legs being disposed substantially centrally of the intermediate section and said other of such legs being disposed one adjacent the remote end of each of the other two sections respectively, means adjustably mounting the leg of the intermediate section, spaced laterally disposed extensible arm means carried by said intermediate section for engagement with the back of an adjacent seat for maintaining said device in fixed location.

3. A device for application along the front of the rear seat of an automobile for transforming such seat into a combination child's crib and play pen, comprising a pair of spaced fence sections for disposition in upright substantially end-to-end relation, an intermediate connecting fence section of less length, each of said fence sections having top and bottom rails and spaced connecting bars between the same, padding applied to the top rails of said pair of fence sections, said fence sections having longitudinally disposed interfitting relatively slidable portions and depending supporting legs, one of such legs being carried by the intermediate section and said other of such legs being disposed one adjacent the remote end of each of the other two sections respectively, and spaced laterally disposed extensible arm means carried by said intermediate section for engagement with the back of an adjacent seat for maintaining said device in fixed location.

4. A device for application along the front of the rear seat of an automobile for transforming such seat into a combination child's crib and play pen, comprising spaced fence sections for disposition in upright substantially end-to-end relation, an intermediate connecting fence section, each of said fence sections having top and bottom rails and spaced connecting bars between the same, said fence sections having longitudinally disposed interfitting relatively slidable portions and depending supporting legs, one of such legs being carried by the intermediate section and said other of such legs being disposed one adjacent the remote end of each of the other two sections respectively, and spaced laterally disposed extensible arm means carried by said intermediate section for engagement with the back of an adjacent seat for maintaining said device in fixed location.

5. A device for transforming the rear seat of an automobile into a combination child's crib and playpen, comprising cooperating longitudinally slidable fence sections disposable in upright position and horizontally extensible to conform to the width of the vehicle to which the device is applied, to form a barrier across the vehicle seat at the front edge of the same, supporting means for said device for engaging the floor of the vehicle in which the device is located, and additional adjustable supporting means extending laterally of said device and forwardly of the vehicle for limiting movement away from the front edge of the seat to which the device is applied.

6. A retaining device for application between front and rear seats of a vehicle and to the forward portion of the rear seat for providing an enclosure for a child above the rear seat, comprising a pair of end sections and an intermediate section relatively interengageable and movable to adjust the overall length thereof, a bracket member on one of said sections adjustably engageable with the floor and adjustable means on said device for engaging the back surface of the front seat to brace the top and bottom of the device against movement away from said rear seat.

ROBERT P. JACOBSEN.

REFERENCES CITED

The following references are of record in the file of this patent:

UNITED STATES PATENTS

| Number | Name | Date |
|---|---|---|
| 45,879 | Chapin | Mar. 21, 1865 |
| 141,677 | Tuttle | Aug. 12, 1873 |
| 2,048,955 | Showalter | July 28, 1936 |
| 2,369,552 | Ferran | Feb. 13, 1945 |